(12) United States Patent
Minato

(10) Patent No.: US 7,242,976 B2
(45) Date of Patent: Jul. 10, 2007

(54) DEVICE AND METHOD FOR SELECTING CODES

(75) Inventor: Naoki Minato, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 643 days.

(21) Appl. No.: 10/815,981

(22) Filed: Apr. 2, 2004

(65) Prior Publication Data

US 2005/0226187 A1   Oct. 13, 2005

(51) Int. Cl.
   *H04B 7/00*   (2006.01)
   *H04Q 7/20*   (2006.01)
(52) U.S. Cl. .................. 455/703; 455/434; 455/454; 455/702; 370/320; 370/335; 370/342
(58) Field of Classification Search ................. 455/403, 455/414.1, 434, 435.1, 445, 454, 432.2, 511, 455/515, 701, 702, 703, 72; 370/335, 342, 370/320
See application file for complete search history.

(56) References Cited

FOREIGN PATENT DOCUMENTS

| JP | 2004 80385 | 3/2004 |
| WO | WO09907087 | 2/1999 |

*Primary Examiner*—Tony T. Nguyen
(74) *Attorney, Agent, or Firm*—Rabin & Berdo, P.C.

(57) ABSTRACT

According to the present invention, a code selection device wherein, an unused spreading code, or one of a plurality of unused spreading codes, is selected for allocation to a new communication channel, comprises: a dummy spreading signal generator for despreading dummy original data by using the unused spreading code or codes available for employment, and generating dummy spreading signals; a superimposing unit for superimposing the dummy spreading signals and received signals and forming pseudo superimposed signals; a despreading unit for despreading the pseudo superimposed signals by using the unused spreading codes related to the corresponding pseudo superimposed signals, and the spreading codes already used for communication channels that previously have been established; and a spreading code selector for selecting an unused spreading code based on data for the communication channels reproduced for the pseudo superimposed signals and the reproduced dummy original data. With this configuration, a method can be provided whereby, in accordance with the usage condition of a network, a code sequence having a preferable correlation property can be selected, from among a number of code sequences that are generated, and allocated to a communication channel.

12 Claims, 4 Drawing Sheets

DEVICE AND METHOD FOR SELECTING CODES

BACKGROUND OF THE INVENTION

1. Field of the Invention

The present invention relates to a device and a method for selecting codes, and can be applied for a code selection device used to select spreading code (hereinafter referred to as "code") in order to allocate to a communication apparatus employing, for example, a code division multiple access (CDMA) system, a new communication channel having a preferable correlation property.

2. Related Background Art

Conventionally, a time division multiple access (TDMA) system is mainly employed as an access system for an optical access network, for example. According to the TDMA system, however, when a plurality of channels are multiplexed to a single optical fiber, the period of time it can be used by an individual user is fixed, and an unused period, during which communication by a designated, specified user is not performed, can not be utilized by another user. Therefore, the band available for each user across the network can not be utilized to the maximum. To resolve this problem, a CDMA system has been proposed.

An example method for providing a CDMA system via an the optical access network is disclosed, for example, in reference: "COMMUNICATION USING SPREAD SPECTRUM METHODS OVER OPTICAL FIBERS", WO9907087. According to this method, a transmission side modulates an optical carrier that has been coded (spectrum spreading) by using a spreading code sequence (hereinafter referred to as "code") in an electric region, and a reception side directly detects an optical modulated signal and decodes (spectrum despreading) the signal in an electric region.

With this method proposed in the reference, while an increase in the data transmission rate for one communication channel is limited, the standard parts used for a conventional CDMA system, such as a mobile communication system, can be employed. Therefore, the CDMA system can be provided comparatively easily.

In addition, since wavelength control and filtering are not required in an optical region, it is possible to construct the system at a low cost.

For a network using the CDMA system in addition to the optical access network in the above reference, the following two methods are available for the allocation of communication channels.

The first method is a method for allocating, to the transmitter of each terminal, a fixed code sequence (spreading code sequence) that is already known in a network. The second method is a method whereby, instead of allocating a fixed code to the transmitter of each terminal, a code sequence is transmitted when a connection is established by using a control line, and a code is allocated each time communication is initiated. Example code sequences used for this method are the M sequence, the Gold sequence and the Kasami sequence.

For a network that uses the CDMA system, it is known that the number of channels is extremely reduced when a code sequence is used, while taking into account the phase difference between different channels, that is a complete orthogonal sequence.

Therefore, generally, systems tend to be constructed that use incomplete orthogonal code sequences. As a result, when different channels employ a communication path at the same time, due to the non-orthogonality of the codes that are employed, an interference occurs between the communication channels, and the number of occupation channels is limited.

The magnitude of the inter-channel interference depends on the phase difference between the communication channels and the correlation property of the code that is currently being employed. Thus, in order to increase the number of occupation channels, it is preferable that codes having a preferable correlation property be selected and allocated.

For the above described two communication channel allocation methods, code sequences are employed for which the correlation properties are regarded as being preferable; however, a method is not described whereby to select and allocate one of several types of code sequences that are to be used for the entire network.

Therefore, a demand exists for the provision of a method whereby, in accordance with the usage condition of a network, a code sequence having a preferable correlation property can be selected, from among a number of code sequences that are generated, and allocated to a communication channel.

SUMMARY OF THE INVENTION

To respond to this demand, according to the present invention, a code selection device wherein, an unused spreading code, or one of a plurality of unused spreading codes, differing from spreading codes already allocated to communication channels that have previously been established, is selected for allocation to a new communication channel, comprises a dummy spreading signal generator for despreading dummy original data by using the unused spreading code or codes available for employment, and generating dummy spreading signals, a superimposing unit for superimposing the dummy spreading signals and received signals, and forming pseudo superimposed signals that correspond to the unused spreading codes available for employment, a despreading unit for despreading the pseudo superimposed signals by using the unused spreading codes that are related to the corresponding pseudo superimposed signals, and the spreading codes that are already used for the communication channels that previously have been established, and a spreading code selector for, based on data for the communication channels reproduced for the pseudo superimposed signals and the reproduced dummy original data, selecting an unused spreading code for allocation to a new communication channel.

Further, according to the present invention, a code selection method whereby an unused spreading code, or one of a plurality of unused spreading codes, differing from spreading codes already allocated to communication channels that have previously been established is selected for allocation to a new communication channel, comprises the steps of: a dummy spreading signal generator despreading dummy original data by using the unused spreading code or codes available for employment, and generating dummy spreading signals, a superimposing unit superimposing the dummy spreading signals and received signals, and forming pseudo superimposed signals that correspond to the unused spreading codes available for employment, a despreading unit despreading the pseudo superimposed signals by using the unused spreading codes that are related to the corresponding pseudo superimposed signals, and the spreading codes that are already used for the communication channels that previously have been established, and a spreading code selector selecting an unused spreading code for allocation to a new communication channel, based on data for the communication channels reproduced for the pseudo superimposed signals and the reproduced dummy original data.

DETAILED DESCRIPTION OF THE PREFERRED EMBODIMENTS (A) Explanation of the Basic Concept for a Code Allocation Method Before an explanation is given for a device and a method for selecting a code according to the preferred embodiments of the invention, the basic concept of the code selection method employed for this invention will be described.

As is described above, the magnitude of the interference between two different channels is affected by the correlation properties of codes allocated to these channels.

However, data related to the individual channels are not always synchronized with each other, and data for one channel may be inverted between the data bits of the other channel.

Therefore, while taking into account a case wherein data for one channel is inverted between the data bits for the other channel, the code selection method of this invention is employed based on correlation values obtained by the following equations (1) and (2). The correlation when data for one channel are not inverted between the data bits for the other channel is called an even correlation, and is obtained by using equation (1) below (called an even function). A correlation when data for one channel are inverted between the data bits for the other channel is called an odd correlation, and is obtained by using equation (2) below (called an odd function).

In these equations, M denotes the number of code chips, R denotes a correlation function, C denotes a code, and k and l denote the numbers (modulo M) with M being a modulo. When i=j, R represents an auto-correlation function, and when i≠j, R represents a cross-correlation function.

Further, L denotes a relative time location between channels. Between 0 and M−1, one correlation function value is determined in accordance with the transmission timing for each channel, and this value is called a correlation value. When this correlation value is employed, a receiving data signal obtained by despreading becomes an auto-correlation value, and a receiving interference signal becomes a cross-correlation value. For multiple accesses through three channels or more, the receiving interference signal becomes the sum of the cross-correlation values.

The cross-correlation function will now be explained by using an 8-chip Walsh code as an example.

The Walsh code can be generated by using an initial value W0 represented by the following equation (3) and a recurrence formula represented by the following equation (4), and each row can be used as one code sequence.

On the left side of equation (4), Wk is a matrix having two values, "0" and "1", as elements, and Wk¥ is a matrix having inverted values of "0" and "1" for the matrix elements of Wk.

For the eight-chip Walsh code, eight code sequences can be generated by using equation (4). For the sake of convenience, the first row is defined as code 1, and the i-th row is defined as code i.

Figures 2, 3:
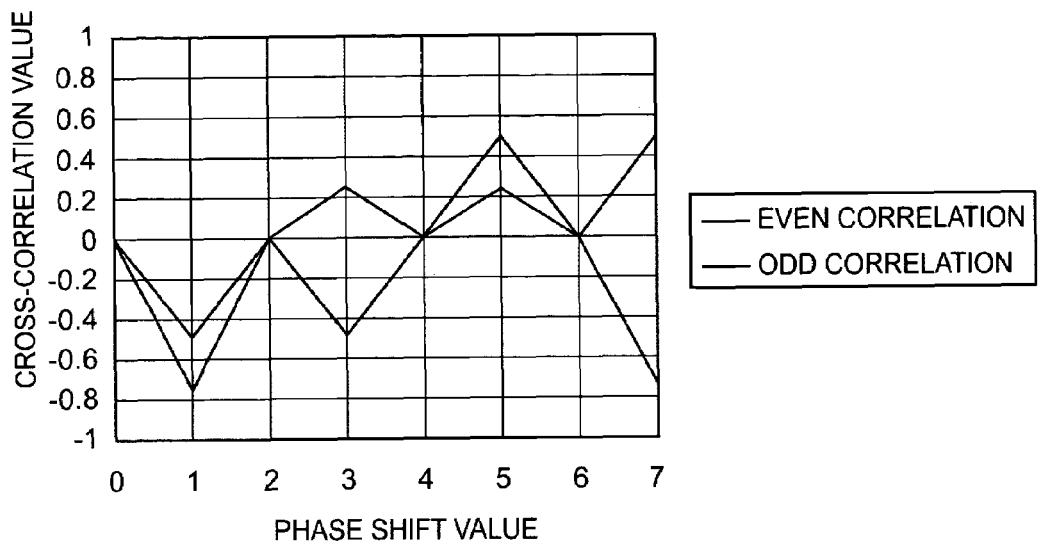
FIG. 2 is a diagram for explaining the relationship between a relative time location and a cross-correlation value when specific channels are employed as an example.
FIG. 3 is a diagram for explaining maximum cross-correlation values for the combinations of all the channels that are allocated using the Walsh code of eight chips.

FIG. 2 is a graph for explaining a relationship between relative time location (phase shift value) 1 and a cross-correlation value between channels that are allocated, for example, by codes 7 and 8. In this case, the cross-correlation value is divided by the number of chips.

As is shown in FIG. 2, the cross-correlation value differs depending on the phase shift value 1, and on either the even correlation or the odd correlation.

Therefore, for the even correlation and the odd correlation, the cross-correlation values are obtained at the relative time locations 1 whereat the absolute cross-correlation values are the maximum, and a larger cross correlation value is called a maximum cross-correlation value.

FIG. 3 is a diagram for explaining the maximum cross-correlation values for the combinations of all the channels allocated by the 8-chip Walsh codes. As is shown in FIG. 3, even when the same Walsh code is allocated, the cross-correlation value differs depending on the combination of the codes.

Figure 4:
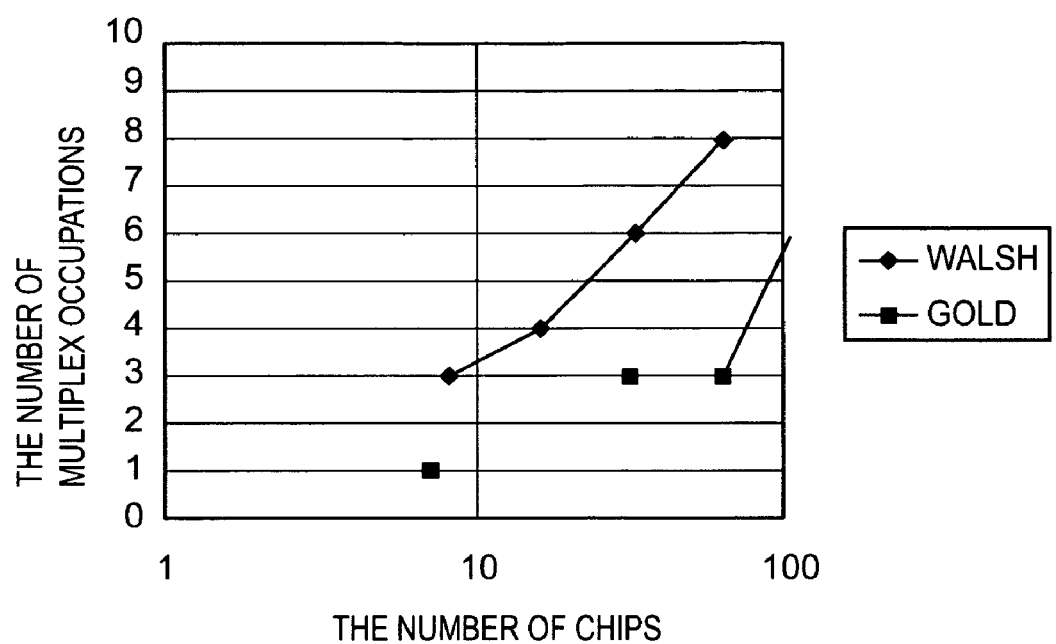
FIG. 4 is a diagram for explaining the relationship between the number of chips and the number of multiplex occupations under a condition wherein the sum of the maximum cross-correlation values is smaller than one.

FIG. 4 is a graph for explaining a relationship between the number of chips and the number of multiplex occupations under the condition where the sum of the maximum cross-correlation values is smaller than one. At this time, a code is selected so that the sum of the maximum cross-correlation values is the minimum.

In FIG. 4, the number of multiplex occupations included in the Walsh code of eight chips is three. Based on this value, and while referring to FIG. 3, codes are selected so that the sum of the maximum cross-correlation values of the three code sequences is less than one.

In FIG. 3, as these three code sequence combinations, the code sequence combination having the Walsh numbers 1, 2 and 3 can be selected; however, the code sequence combination having the Walsh numbers 1, 3 and 7 can not be selected because the sum of the maximum cross-correlation values exceeds one.

As is described above, it is obvious that code selection is important to the provision of multiplex occupations.

For the comparison of codes of different types, the calculation results for the Gold code are also shown in FIG. 4. As is shown in FIG. 4, for a system where spreading is performed for about 100 chips, through code selection, more multiplex occupations can be obtained by using the Walsh code.

As is described above, in order to reduce interference, a code may be selected and allocated to a channel, so that the sum of the cross-correlation values is reduced. For this code selection, only one code need be prepared upon the introduction of the system, and the maximum cross-correlation values of all the combinations calculated. However, when there are a great number of chips, the calculation time required for one combination is increased by the order of the square of the number of chips, and the number of combinations is also increased to the square of the number of chips. Therefore, the requirement for too much calculation time is a drawback for this case. Further, it is rare that the maximum cross-correlation value will be obtained for all the multiplex channels, and actually, it can be expected that the number of multiplex occupations can be slightly increased.

Based on the above described basic concept, the code selection method of this invention performs code selection.

First, when one channel is to be added while no channels are currently being employed, one code is selected at random from a code sequence that has been prepared, and is allocated to a new channel.

When one channel is to be added while one or more channels are currently being employed, a received signal and a dummy signal for correlation value calculation are employed to calculate cross-correlation values for all the codes that have been prepared in advance and that are not yet being used, and the maximum cross-correlation values are obtained for the currently employed channels and the channel to be added.

The individual cross-correlation values are compared with a specific level value (determination threshold value), and when a cross-correlation value exceeds this value, a corresponding code is excluded. From the thus remaining codes, the sum of the cross-correlation values is obtained for each individual channel, and a code for which the sum of the cross-correlation values is the minimum is selected. When there are more than one such code, one code is selected at random.

When all the codes are excluded as a result of the comparison with the threshold value, it is assumed that the channel allocation is disabled, and a connection received from a requesting terminal is rejected.

Through this processing, a selected code is allocated to a new channel.

(B) First Embodiment

A device and a method for selecting a code according to a first embodiment of the present invention will now be described while referring to the accompanying drawings.

For the first embodiment, an explanation will be given for a communication system using the CDMA system wherein a code selection device is provided for a reception apparatus on a station side.

(B-1) Configuration for the First Embodiment

Figure 1:
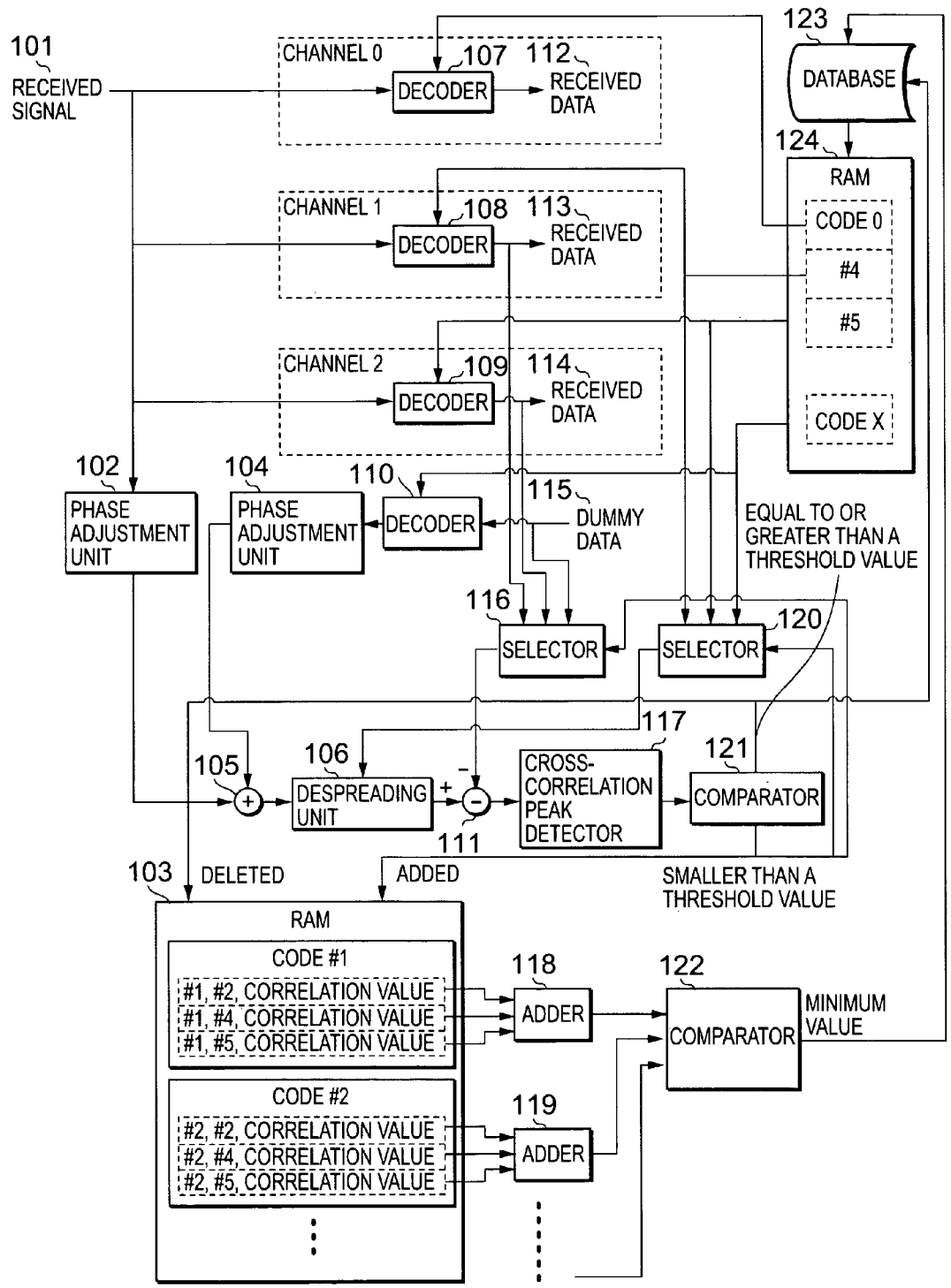
FIG. 1 is a block diagram showing the internal configuration of a reception apparatus according to a first embodiment of the present invention.

FIG. 1 is a diagram showing the internal configuration of the reception apparatus on the station side according to the first embodiment of the invention. Although not shown in FIG. 1, the reception apparatus includes an inter-code management function, and separate lines are provided for a control channel for bit synchronization between a terminal and a base station and for a control channel for connection and disconnection.

In FIG. 1, a Walsh code having eight chips is defined as a channel allocated code. For communication, a code having Walsh code number 4 (hereinafter referred to as #4) is allocated to channel 1, a code having Walsh code number 5 (hereinafter referred to as #5) is allocated to channel 2, and the other channels are unused.

In this embodiment, a code selection method will be described whereby, from among the unused channels, an access request is issued to channel 0.

As is shown in FIG. 1, the reception apparatus for this embodiment comprises: a database 123 used to manage 8-chip Walsh codes at least used across a network; a RAM 124; decoders 107 to 109 provided for each channel; a phase adjustment unit 102 for delaying a received signal; a spread-ing unit 110; a phase adjustment unit 104 for delaying a signal output by the spreading unit 110; selectors 116 and 120; an adder 105; a despreading unit 106; a subtractor 111; a cross-correlation peak detector 117; a comparator 121; a RAM 103 used to record code information for each code; adders 118 and 119 for obtaining, for each code, the sum of correlation values stored in the RAM 103; and a comparator 122, for comparing the correlation value sums obtained by the adders 118 and 119.

The database 123 is a recording device for managing codes used across the network, and for holding each code sequence (e.g., 10011001 for #4), the state of each code (e.g., currently used, unused, or selected by the comparator 122) and information concerning the number of a decoder currently employed. When an access request is received, the state of each code stored in the database 123 is examined, a code in the "unused" state is written to the code x portion in the RAM 124, and code selection processing that will be described later is performed. When, as a result of code selection, a code output by the comparator 122 is set to the "selected" state, this information is written to code 0 in the RAM 124. When information has been written to code 0 in the RAM 124, the state of this code is set to "used".

The RAM 124 is a storage device for reading a code from the database 123 and writing a code to one of the decoders 107 to 109, the spreading unit 110 or the despreading unit 106.

The decoder 107 performs the correlation calculation for a received signal 101 based on the code read from the RAM 124, determines whether the result is "0" or "1", and outputs the result as received data 112.

The decoders 108 and 109 have the same function as the decoder 107. The decoder 108 outputs the obtained result as received data 113, while the decoder 109 outputs the obtained result as received data 114.

The spreading unit 110 employs a code read from the RAM 124 to perform the spreading operation for dummy data 115 internally generated by the reception apparatus, and outputs a dummy spreading signal (hereinafter referred to as a "spreading signal") to the phase adjustment unit 104. In this case, the code read from the RAM 124 is defined as "code A". The "code A" is code to be allocated.

The dummy data 115 is the data internally generated by the reception apparatus in order to calculate an interference level when one channel is added, and the dummy data 115 has the same speed as the data transfer rate. When the interference level is to be calculated by using the dummy data 115, the correlation values for an even function and an odd function must be calculated at high speed. Therefore, the dummy data 115 in this embodiment consists of a binary sequence of "11001100" (i.e., a repetition of "1100").

The phase adjustment unit 104 is means for receiving a spreading signal from the spreading unit 11, and for delaying the spreading signal in synchronization with the operation timing of the despreading unit 106. Thereafter, the phase adjustment unit 104 transmits the delayed signal to the adder 105. The phase adjustment unit 104 can delay the transmission of the signal by using, as one unit, the period for one chip of the spreading code, and can provide a delay equivalent to the periods for 0 to 7 chips.

The phase adjustment unit 102 is means for delaying the received signal 101 in synchronization with the operational timing for the despreading unit 106. The phase adjustment unit 102 then transmits the delayed signal to the adder 105. The phase adjustment unit 102 can delay the signal by employing, as one unit, the period for one chip of a spreading code, and can provide a delay equivalent to the periods for 0 to 7 chips.

The adder 105 receives the spreading signal for the dummy data delayed by the phase adjustment unit 104 and the received signal delayed by the phase adjustment unit 102, adds these signals to obtain a pseudo superimposing signal, and transmits the pseudo superimposing signal to the despreading unit 106.

The selector 120 receives, from the RAM 124, the codes used for communication (#4 and #5 in this embodiment) and a code to be added in response to an access request (one of codes #1, #2, #3, #6, #7 and #8; hereinafter referred to as a "code x"). Each time the comparator 121 determines that the output has a cross-correlation peak that is less than the threshold value, the selector 120 sequentially selects one code from among the codes currently employed for the communication and the codes that are to be added (in this case, #4, #5 and code x), and transmits the selected code to the despreading unit 106.

The selector 116 receives data received through the currently employed channels (i.e., the received data 113 and 114) and the dummy data 115. Each time the comparator 121 determines that the output has a cross-correlation peak that is less than the threshold value, the selector 116 sequentially selects one of these codes and transmits the selected code to the subtractor 111.

The despreading unit 106 receives, from the adder 105, the pseudo superimposing signal obtained by adding the spreading signal of the phase adjustment unit 104 and the signal received by the phase adjustment unit 102, performs despreading based on the code selected by the selector 120, and transmits the despreading signal to the subtractor 111. At this time, the code selected by the selector 120 is defined as "code B". The despreading unit 106 employs equations (1) and (2) described above to obtain the correlation value for the code B relative to the pseudo superimposing signal.

The subtractor 111 receives the signal obtained by the despreading unit 106, subtracts, from the output, the data selected by the selector 116, extracts only the cross-correlation value (interference element) of the signal obtained by the despreading unit 106, and transmits the cross-correlation value (interference element) to the cross-correlation peak detector 117.

For example, in this embodiment, assuming that the code B is defined as "#1", when the despreading unit 106 has performed despreading for the addition signal (superimposing signal) using "#1", the output includes the cross-sectional value between #1 and #4 that is currently employed, the cross-correlation value between #1 and #5 that is currently employed, and the auto-correlation value of #1. The subtractor 111 eliminates the auto-correlation value of #1 from the output of the despreading unit 106, and extracts the cross-correlation values.

The cross-correlation peak detector 117 is means for receiving the cross-correlation values (interference elements) of the subtractor 111, and for outputting, from among the absolute values for the cross-correlation values (interference element), the maximum value. The cross-correlation peak detector 117 holds the maximum cross-correlation values for the individual codes. After the cross-correlation peak detector 117 has transmitted the maximum value to the comparator 121, the detector 117 deletes the maximum value.

The comparator 121 is means for determining whether the output of the cross-correlation peak detector 117 is smaller than a specific threshold value. When the comparator 121 determines that the output of the cross-correlation peak detector 117 is smaller than the threshold value, the comparator 121 writes code information to the RAM 103. But when the comparator 121 determines that the output is equal to or greater than the threshold value, and when the code information concerning the "code A" is present in the RAM 103, the comparator 121 deletes the code information.

The specific threshold value is used in order to represent that, when an obtained correlation value is equal to or greater than a predetermined value, a corresponding code will not be selected. In this embodiment, the threshold value is defined as the maximum auto-correlation value. The code information includes at least three sets of information, i.e., the "code A" and the "code B" and their cross-correlation values.

The RAM 103 is a storage device for reading or deleting code information in accordance with the determination results obtained by the comparator 121, and for transmitting, to the adders 118, 119, . . . , the cross-correlation values included in the code information group for each "code A".

The adders 118, 119, . . . are means for reading the cross-correlation values from the RAM 103, and for calculating and outputting the sum of the cross-correlation values for the "code A". The adders 118 and 119 are provided for each "code A" in the RAM 103, and in FIG. 1, only the adders provided for the code #1 and the code #2 are shown.

The comparator 122 receives, from the adders 118, 119, . . . , the sums of cross-correlation values for the individual codes, obtains the minimum value from these sums of cross-correlation values for the individual codes, and transmits, to the database 123, a code corresponding to the minimum value.

(B-2) Operation for the First Embodiment

The code selection operation of the code selection device for this embodiment will now be described.

Communication is currently performed when the code #4 is allocated to channel 1 and the code #5 is allocated to channel 2, and an access request is issued to channel 0.

A search is performed to determine whether there is an unused code among the codes managed in the database 123. When an unused code is not found, it is determined that a connection is disabled.

When there is an unused code, the following method is used to select a code to be allocated.

In this case, cross-correlation values are to be calculated for the individual codes in the order #1, #2, #3, #6, #7 and #8, for example.

First, the code #1, managed in the database 123, is written to the RAM 124 and then is transmitted to the spreading unit 110 and the selector 120. At this time, the code provided for the spreading unit 110 is especially defined as "code A".

The spreading unit 110 performs the spreading operation for the code #1 that is read from the RAM 124, i.e., multiples the code #1 by dummy data that is internally generated by the reception apparatus, and transmits the resultant spreading signal to the phase adjustment unit 104. The phase adjustment unit 104 transmits the received spreading signal to the adder 105 first, with a delay time 0 unchanged. The phase adjustment unit 104 also transmits the received spreading signal to the phase adjustment unit 102, which then transmits this signal to the adder 105, with the delay time 0 unchanged. The adder 105 then transmits to the despreading unit 106 a pseudo superimposing signal obtained by adding the spreading signal and the received signal.

The selector 120 is set so as to select the received code #1 as a default, and transmits the selected code #1 to the despreading unit 106. At this time, the code provided for the despreading unit 106 is especially defined as "code B".

Based on the code #1 selected by the selector 120, the despreading unit 106 performs the despreading operation for the pseudo superimposing signal received from the adder 105.

The subtractor 111 subtracts the output of the despreading unit 106 from the dummy data 115 selected as a default by the selector 116, i.e., subtracts the auto-correlation value of the code #1, and transmits to the cross-correlation peak detector 117 only the cross-correlation values (interference elements) of the despreading data of the code #1. The cross-correlation peak detector 117 calculates the absolute values of the individual cross-correlation values.

In this manner, the calculation of the cross-correlation values is repeated several times, and only the maximum value of the cross-correlation values is held by the cross-correlation peak detector 117.

Following this, the phase adjustment unit 102 delays the received signal by a period equivalent to one chip, and the above described cross-correlation value calculation is performed for this received signal delayed by one chip. Then, only the maximum value of the cross-correlation values is held by the cross-correlation peak detector 117.

The phase adjustment unit 102 sequentially delays the received signal by periods equivalent to two, three, ... and seven chips, and through the above described processing, the maximum cross-correlation values are held by the cross-correlation peak detector 117.

The cross-correlation peak detector 117 transmits, to the comparator 121, the maximum value of the cross-correlation values that are stored. After this maximum value has been output to the comparator 121, this value is deleted from the cross-correlation peak detector 117.

When the comparator 121 determines that the maximum cross-correlation value is equal to or greater than the threshold value, the comparator 121 transmits an instruction to the database 123 to write the next code #2 to the RAM 124.

When the comparator 121 determines that the maximum cross-correlation value is smaller than the threshold value, code information for the code #1 is additionally written to the RAM 103, and the selectors 120 and 116 shift the selection order by one. Then, the selector 120 selects code #4, and the selector 116 selects the received data 113.

Next, when a new code A is selected, an interference level is calculated that the channel allocated by the currently used code provides for the channel already allocated by the code A.

First, for the code #4 as well as the code #1, cross-correlation values are calculated through the despreading process. For this calculation, the delay time used by the phase adjustment unit 102 is fixed as 0, and the phase adjustment unit 104 delays the signal by a period equivalent to one chip.

When the comparator 121 determines that the maximum value of the cross-correlation values is equal to or greater than the threshold value (the maximum value of the auto-correlation values for the code #1), the comparator 121 transmits an instruction to the database 123 to delete all the information for a group for which the "code A" in the RAM 103 is the code #1, and to write the next code (#2) to the RAM 124.

When the comparator 121 determines that the maximum cross-correlation value is smaller than the threshold value, this code information is additionally stored in the RAM 103, and the selectors 120 and 116 shift the selection order by one. Then, the selector 120 selects code #5, while the selector 116 selects the received data 114.

For the code #5 as well as the code #4, the cross-correlation values are calculated through the despreading operation. At this time, the delay time used by the phase adjustment unit 102 is fixed as 0, and the phase adjustment unit 104 delays the signal by the period of one chip.

When a series of the cross-correlation value calculation is completed for the code #1 relative to all the codes (#4 and #5) currently used for communication, an instruction is transmitted to the database 123 to write the next code #2 to the RAM 124. Similarly, the cross-correlation values for the codes #3, #6, #7 and #8 are sequentially calculated.

Furthermore, based on the determination by the comparator 121 of the magnitude of the cross-correlation value, the code information for the pertinent code ("code A") is added or deleted, so that code information for an available code to be selected can be recorded in the RAM 103.

When the cross-correlation values for all the codes have been obtained, the code information stored in the RAM 103 is searched, and a code is selected based on the search results.

When the code information is not found in the RAM 103, it is determined that the access is disabled.

When at least one set of code information is found in the RAM 103, the adders 118, 119, ... calculate, for each code, the sum of the cross-correlation values (the sum of the cross-correlation values for the "code A"). The comparator 122 compares the sums of the cross-correlation values for the individual codes, determines the minimum value, and transmits to the database 123 a code ("code A") that corresponds to the minimum value.

For example, when a plurality of sets of code information are found in the RAM 103, and when the comparator 122 determines that a code having the smallest sum of the cross-correlation values is code #2, the code #2 in the database 123 is set to the state indicating "selected by the comparator 122".

The code (#2) in the database 123, which is set in the state indicating "selected by the comparator 122", is written in the RAM 124. Thereafter, the code is written to the decoder 107, and the code selection is terminated.

In the database 123, a code written to the decoder 107 is set to the "currently used" state, and the comparator 122 deletes the selected code.

Thereafter, the reception is started by a reception block including the decoder 107.

(B-3) Effects Provided by the First Embodiment

As is described above, according to the embodiment, the comparator 121 compares the obtained maximum cross-correlation value with the threshold value, and stores in the RAM 103 only code information for a code having a small maximum cross-correlation value that satisfies a predetermined condition. Further, from among codes recorded in the RAM 103, a code having the smallest cross-correlation value sum can be selected. Therefore, a code having a desirable correlation property can be selected and can be allocated for a channel.

In addition, according to the present invention, when the comparator 121 determines that the maximum cross-correlation value for a specific code is equal to or greater than the threshold value, the comparator 121 deletes, from the RAM 103, code information for this code. Therefore, the other combinations for the code need not be considered, and the period of time required to calculate the maximum cross-correlation value can be reduced.

(C) Second Embodiment

A device and a method for selecting a code according to a second embodiment of the present invention will now be described while referring to the accompanying drawings.

In the second embodiment, as in the first embodiment, an explanation will be given for a case wherein a reception apparatus on a station side employing the CDMA system comprises a code selection device. The code selection device according to the second embodiment comprises, for each channel, a cross-correlation peak detector and a comparator for comparing a cross-correlation value with a threshold value, and performs a pipelining process to select a code.

(C-1) Configuration for the Second Embodiment

Figure 5:
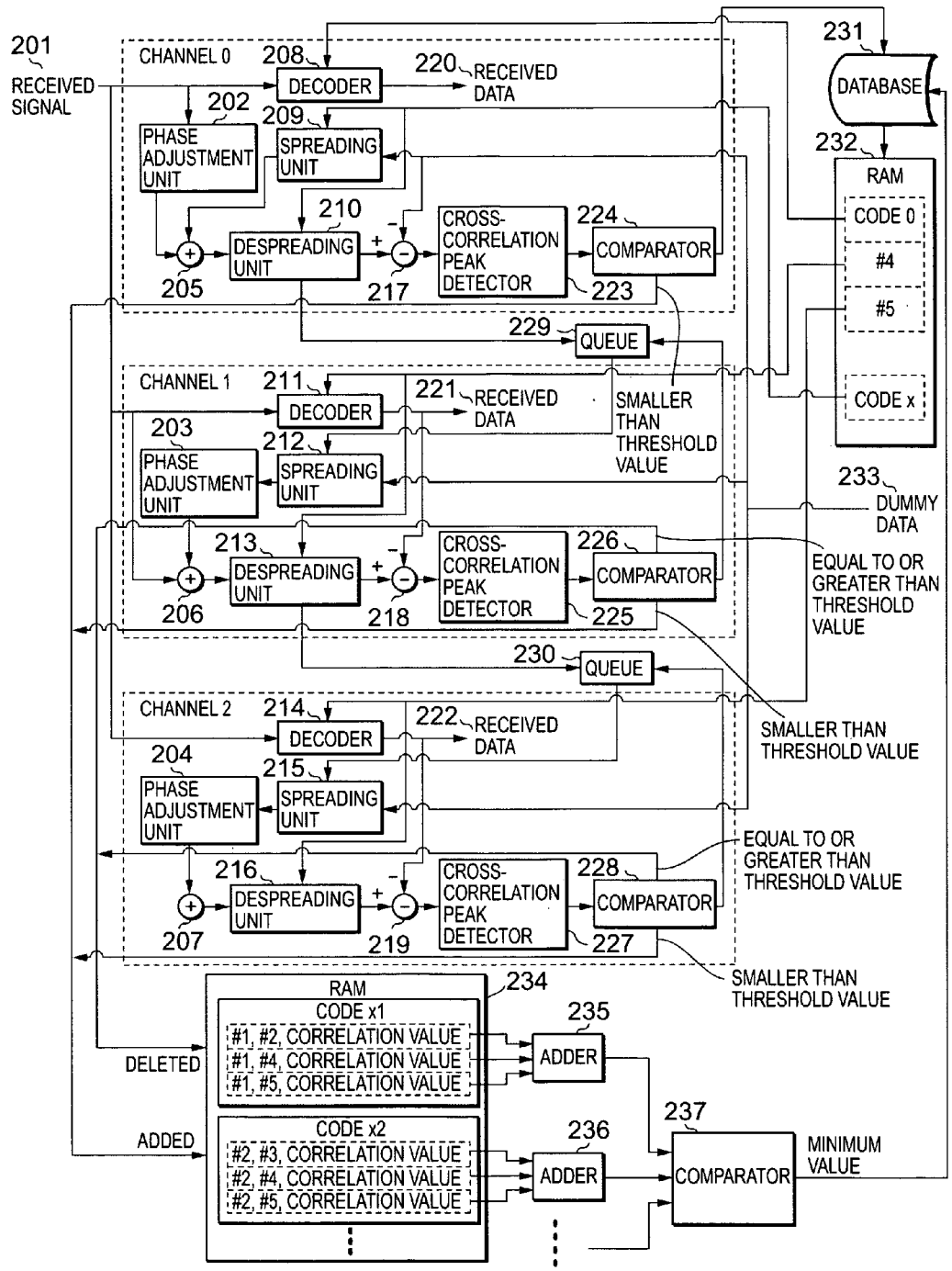
FIG. 5 is a block diagram showing the internal configuration of a reception apparatus according to a second embodiment of the present invention.

FIG. 5 is a block diagram showing the internal configuration of the reception apparatus according to the second embodiment.

As is shown in FIG. 5, the reception apparatus according to the second embodiment comprises: a database 231, a RAM 232, queues 229 and 230, a RAM 234, adders 235 and 236 and a comparator 237, and cross-correlation value calculation units provided for the individual channels (channels 0 to 2).

The cross-correlation value calculation units include, respectively, decoders 208, 211 and 214, phase adjustment units 202, 203 and 204, spreading units 209, 212 and 215, adders 205, 206 and 207, despreading units 210, 213 and 216, subtractors 217, 218 and 219, cross-correlation peak detectors 223, 225 and 227, and comparators 224, 225 and 226.

For the second embodiment, as for the first embodiment, an explanation will now be given for a case wherein an 8-chip Walsh code is employed as a channel allocated code, and wherein, for communication, code #4 is allocated for channel 1 while code #5 is allocated for channel 2, and an access request is issued to channel 0.

Since a database 231, RAMs 232 and 234, the decoders 208, 211 and 214 and adders 235 and 236 in FIG. 5 correspond respectively to the database 123, the RAMs 124 and 103, the decoders 107, 108 and 109 and the adders 118 and 119 explained for the first embodiment, a detailed explanation for them will not be given.

The cross-correlation value calculation unit for channel 0 will be specifically explained, and special functions of the cross-correlation value calculation units for channels 1 and 2 will be described later, at appropriate times.

The spreading unit 209 is means for reading a code from the RAM 232 and employing this code to perform the spreading operation for dummy data 233 that is generated by the reception apparatus, and for transmitting the spreading signal to the adder 205.

The dummy data 233, as well as the dummy data 115, is a binary value sequence consisting of "11001100 . . . " in order to calculate both an even cross-correlation value and odd cross-correlation value. The spreading units 212 and 215 are means having the same functions as the spreading unit 209.

The phase adjustment unit 202 delays a received signal 201 in synchronization with the operation timing employed by the despreading unit 210, and transmits the delayed signal to the adder 205. Furthermore, the phase adjustment unit 202 can delay a signal by employing, as one unit, a period equivalent to one chip of a spreading code, and can employ periods equivalent to 0 to 7 chips as delay times.

The phase adjustment unit 203 delays the output of the spreading unit 212 in synchronization with the operation timing of the despreading unit 213, and transmits the delayed signal to the adder 206. Furthermore, the phase adjustment unit 203 can delay a signal by employing, as one unit, a period equivalent to one chip of a spreading code, and can employ periods of 0 to 7 chips as delay times. The phase adjustment unit 204 is means having the same functions as the phase adjustment unit 203.

The adder 205 receives the received signal delayed by the phase adjustment unit 202 and the spreading signal delayed by the spreading unit 209, adds these signals together and transmits the resultant signal to the despreading unit 210.

The adder 206 receives the received signal and the spreading signal delayed by the phase adjustment unit 203, and adds these signals together and transmits a resultant signal to the despreading unit 213. The adder 207 is means having the same functions as the adder 206.

The despreading unit 210 is means for receiving the output of the adder 205 and performing the correlation operation by using the same code as that used by the spreading unit 209, and for transmitting the obtained results to the subtractor 217.

The despreading unit 213 is means for receiving the output of the adder 206, and for performing the correlation operation by using the same code as that used by the decoder 211 and transmitting the obtained results to the subtractor 217. The despreading unit 216 is means having the same functions as the despreading unit 213.

The cross-correlation peak detector 223 sequentially receives, from the subtractor 217, the results obtained by subtracting the dummy data 233 from the results output by the despreading unit 210, and transmits, to the comparator 224, the maximum value of the absolute values of the received values.

The cross-correlation peak detector 225 sequentially receives, from the subtractor 218, the results obtained by subtracting received data 221 from the results output by the despreading unit 213, and transmits, to the comparator 226, the maximum value of the absolute values of the received values. The cross-correlation peak detector 227 is means having the same functions as the cross-correlation peak detector 225.

The comparator 224 is means for receiving the maximum cross-correlation value from the cross-correlation peak detector 223, and for determining whether the maximum cross-correlation value is smaller than a specific threshold value. When the comparator 224 determines that the maximum cross-correlation value is smaller than the threshold value, the comparator 224 transmits an instruction to the database 231 to write code information to the RAM 234 and to read the next unused code therefrom. When the comparator 224 determines that the maximum cross-correlation value is equal to or greater than the threshold value, and when code information about a "code A" is present in the RAM 234, the comparator 224 transmits an instruction to the database 231 to delete the code information and to read the next unused code.

The comparator 226 is means for receiving the maximum cross-correlation value from the cross-correlation peak detector 225, and for determining whether the maximum cross-correlation value is smaller than a specific threshold value. In this embodiment, the specific threshold value is the maximum auto-correlation value. When the comparator 226 determines that the maximum cross-correlation value is smaller than the threshold value, the comparator 226 transmits an instruction to the queue 229 to write code information to the RAM 234 and to read the next unused code therefrom. When the comparator 226 determines that the maximum cross-correlation value is equal to or greater than the threshold value, and when code information concerning a "code A" is present in the RAM 234, the comparator 226 transmits an instruction to the queue 229 to delete the code information and to read the next unused code. The comparator 228 is means having the same functions as the comparator 226.

The queue 229 is means for, in synchronization with the determination timing of the comparator 226, sequentially receiving and storing the codes obtained by the despreading unit 210, and for outputting, to the spreading unit 212, a first code that was received and stored. The queue 230 is means having the same functions as the queue 229.

(C-2) Operation of the Second Embodiment

An explanation will now be given for the code selection operation of the code selection device according to the second embodiment.

Communication is performed while code #4 is allocated for channel 1 and code #5 is allocated for channel 2, and an access request is issued for channel 0. In the following explanation, cross-correlation values for the individual codes are calculated in the order #1, #2, #3, #6, #7 and #8, for example.

First, the code #1 managed in the database 231 is written in the RAM 232, and is then written to the spreading unit 209 and the despreading unit 210. Further, the received signal 201 is transmitted to the phase adjustment unit 202, and then, is transmitted, with a delay time of 0, to the adder 205.

The calculation of the cross-correlation values for the code #1 is performed in the same manner as in the first embodiment, and the absolute values of the obtained cross-correlation values are held by the cross-correlation peak detector 223. The cross-correlation peak detector 223 repeats this calculation several times, and holds only the maximum values.

Then, the phase adjustment unit 202 delays the received signal by periods equivalent to one chip, two chips, . . . and seven chips, and similarly, the maximum values are stored by the cross-correlation peak detector 223.

From among the cross-correlation values held by the cross-correlation peak detector 223, the maximum value is transmitted to the comparator 224, and is compared with the threshold value. After the maximum cross-correlation value is output to the comparator 224, the value held in the cross-correlation peak detector 223 is deleted.

When the comparator 224 determines that the maximum cross-correlation value is equal to or greater than the threshold value, the comparator 224 transmits an instruction to the database 231 to read the next code #2 to the RAM 232.

When the comparator 224 determines that the maximum cross-correlation value is smaller than the threshold value, the comparator 224 transmits an instruction to the database 231 to also write code information for the code #1 to the RAM 234, and to write the next code #2 to the RAM 232.

At the same time, the code (#1) recorded in the despreading unit 210 is added to the queue 229.

The calculation process from the reading of the code #1 from the RAM 232 up to this time is defined as calculation step 1.

Then, for channel 0, when the code #2 is read from the RAM 232 and when the code (#1) has been written to the queue 229, for channel 1, the code (#1) written in the queue 229 is read by the spreading unit 212.

Thereafter, the cross-correlation values for channels 0 and 1 are calculated. At this time, the calculations for channels 0 and 1 are performed at the same time.

When the comparator 224 provided for channel 0 completes the comparison with the threshold value, the comparator 224 transmits an instruction to the database 231 to write the next code #3 in the RAM 232.

When the comparator 224 determines that the maximum value is smaller than the threshold value, at the same time, the code #2 is added to the queue 229.

When the comparator 226 determines that the maximum value is smaller than the threshold value, at the same time, the code #1 is added to the queue 230.

The calculation process from the reading of the code #2 to the RAM 232 up to this time is defined as calculation step 2.

Following this, for channel 0, the code #3 is read from the RAM 232, and the cross-correlation values are calculated in the same manner and are compared with the threshold value.

When the code (#2) for channel 1 is already present in the queue 229, the code (#2) is read from the queue 229 and the cross-correlation values are calculated in the same manner and are compared with the threshold value.

When the code (#1) for channel 2 is present in the queue 230, the code #1 is read form the queue 230 and the cross-correlation values are calculated in the same manner and are compared with the threshold value.

At this time, the cross-correlation values for channels 0, 1 and 2 are also calculated.

The calculation process from the reading of the code #3 from the RAM 232 up to this time is defined as a calculation step 3.

When the comparator 224 for channel 0 completes the comparison with the threshold value, the comparator 224 transmits an instruction to the database 231 to write the next code #6 to the RAM 232.

Further, when the comparator 224 determines that the maximum value is smaller than the threshold value, at the same time, the code #3 is added to the queue 229.

When the comparator 226 determines that the maximum value is smaller than the threshold value, at the same time, the code #2 is added to the queue 230.

As is described above, for each channel, the pipelining process is performed to sequentially read the codes, and the calculation of the cross-correlation values and their comparison with the threshold value are performed in the above described manner.

In this embodiment, it has been determined that, for all the codes, the maximum value is smaller than the threshold value, and the codes have been added to the queue 229 and the queue 230. However, when the maximum values for channels 1 and 2 are equal to or greater than the threshold value, the codes are not added to the queues, and when the code is not present in the queue, at the corresponding calculation step, the performance of the processing is waited for without performing the correlation calculation and the comparison with the threshold value.

When all the calculation steps have been completed, the RAM 234 is examined to determine whether code information is present. When code information is not present in the RAM 234, it is determined that an access is disabled. When code information is present, the sum of the cross-correlation values is calculated for the same "codes A". The "code A" that the comparator 237 determines is the smallest value is transmitted to the database 231.

Assuming that this code is the code #2, the code #2 in the database 231 is set to the "selected by the comparator 237" state.

The code (#2) that is in the "selected by the comparator 237" state and that is stored in the database 231, is written to the RAM 232. Thereafter, the code is written to the decoder 208, and the code selection processing is terminated.

In the database 231, the code written to the decoder 208 is set to the "used" state, and the comparator 237 deletes the selected code.

Then, the reception is started by a reception block that includes the decoder 208.

(C-3) Effects Provided by the Second Embodiment

As is described above, according to the second embodiment, the same effects obtained by the first embodiment can be provided. Furthermore, in this embodiment, through the pipelining processing, the cross-correlation values can be calculated for the individual codes. Therefore, the processing time required for the calculation can be reduced.

(D) Another Embodiment

The above two embodiments have been given for a system employing the CDMA system as an access system, wherein the code selection device is applied for a reception apparatus on a station side. Therefore, the code selection device and the code selection method of the invention can be applied, for example, for an optical access system employing the CDMA system, or for a wireless communication system that employs the CDMA system.

In the above embodiments, the Walsh code has been employed for allocations made to a channel. However, the M sequence code, the Gold code and the Kasami code can also be employed.

Furthermore, in the embodiments, the comparator 122 or 237 obtains the minimum value from among the sums of the cross-correlation values for the individual codes, and a code corresponding to the minimum value is selected from the database 123 or 231. However, the code selection method is not limited to this.

For example, a code may be selected in a time-series manner, so long as it is determined that the sum of the cross-correlation value for each code is considerably smaller than under a predetermined condition. As a result, since the calculation of the sum of the cross-correlation values need not be performed for all the codes stored in the RAM 103 or 234, the code allocation time period can be reduced.

Further, in the above embodiments, a code for a new communication channel is selected from among all the unused codes, in the database 123, that have been designated in advance. However, first, a predetermined number of codes may be selected from all the unused codes, and then, the code selection method of the invention may be employed to select one of the predetermined number of the codes so selected. When a predetermined number of codes are first selected from all the unused codes, the code selection processing can be simplified and the processing time reduced.

As example methods for selecting this predetermined number of codes, either predetermined codes may be selected in order beginning with the first code stored in the database 123, or a group for which cross-correlation values have been predicted may be designated in advance for the individual codes, and based on this group, a predetermined number of codes may be selected.

In addition, in the code selection device of this invention, the comparator 122 compares the sums of the cross-correlation values, and in accordance with the comparison results, one code is always selected from the RAM 103. However, when the sums of the cross-correlation values for all the codes are greater than a predesignated threshold value, a code may not be selected. That is, the allocation of a new communication channel may be rejected.

Moreover, in the first and second embodiments, the code selection device has been applied for an apparatus that performs the single-step spectrum spreading. However, the code selection device may be applied for an apparatus that performs two-step spectrum spreading, i.e., employs the Walsh code for the first spectrum spreading and employs the Gold code for the second spectrum spreading.

According to the present invention, a code selection device wherein, an unused spreading code, or one of a plurality of unused spreading codes, differing from spreading codes already allocated to communication channels that have previously been established, is selected for allocation to a new communication channel, comprises a dummy spreading signal generator for despreading dummy original data by using the unused spreading code or codes available for employment, and generating dummy spreading signals, a superimposing unit for superimposing the dummy spreading signals and received signals and forming pseudo superimposed signals that correspond to the unused spreading codes available for employment, a despreading unit for despreading the pseudo superimposed signals by using the unused spreading codes that are related to the corresponding pseudo superimposed signals, and the spreading codes that are already used for the communication channels that previously have been established, and a spreading code selector for, based on data for the communication channels reproduced for the pseudo superimposed signals and the reproduced dummy original data, selecting an unused spreading code for allocation to a new communication channel.

With this configuration, the number of multiplex occupations can be increased in a system that employs the CDMA system, and the usage efficiency will be improved, even in an access system wherein the number of occupations is explosively increased.

What is claimed is:

1. A code selection device wherein, an unused spreading code, or one of a plurality of unused spreading codes, differing from spreading codes already allocated to communication channels that have previously been established, is selected for allocation to a new communication channel, comprising:
    a dummy spreading signal generator for despreading dummy original data by using the unused spreading code or codes available for employment, and generating dummy spreading signals;
    a superimposing unit for superimposing the dummy spreading signals and received signals and forming pseudo superimposed signals that correspond to the unused spreading codes available for employment;
    a despreading unit for despreading the pseudo superimposed signals by using the unused spreading codes that are related to the corresponding pseudo superimposed signals, and the spreading codes that are already used for the communication channels that previously have been established; and
    a spreading code selector for, based on data for the communication channels reproduced for the pseudo superimposed signals and the reproduced dummy original data, selecting an unused spreading code for allocation to a new communication channel.

2. A code selection device according to claim 1, wherein the spreading code selector includes:
- a decoder for performing despreading for the received signal by using the spreading codes that are already employed for the communication channels that have been established, and for decoding received data;
- a first differential unit for obtaining, for each of the pseudo superimposing signals, a difference between data reproduced for the communication channels that have been established and corresponding data that have been received;
- a second differential unit for obtaining a difference between dummy original data, which is decoded by the despreading unit for each of the pseudo superimposing signals, and the initial dummy original data, which have been employed for the spreading process; and
- a spreading code selector for employing the output of the first differential unit and of the second differential unit to select an unused spreading code to be allocated to a new communication channel.

3. A code selection device according to claim 2, wherein, for a specific pseudo superimposing signal, the spreading code selector compares, with cross-correlation values for another identical pseudo superimposing signal, cross-correlation values between differential data output by the first differential unit and differential data output by the second differential unit, and selects an unused spreading code that has less affect on the communication channels that have been established.

4. A code selection device according to claim 3, wherein the spreading code selector obtains, as cross-correlation values, an even cross-correlation value and an odd cross-correlation value.

5. A code selection device according to claim 2, wherein the same differential configuration is applied, in a time-divided manner, for the first differential unit and the second differential unit.

6. A code selection device according to claim 1, wherein the despreading unit and the spreading code selector are provided for each communication channel; and wherein a spreading code is selected through parallel processing that uses a spreading code for each communication channel.

7. A code selection method whereby an unused spreading code, or one of a plurality of unused spreading codes, differing from spreading codes already allocated to communication channels that have previously been established is selected for allocation to a new communication channel, comprising the steps of:
- a dummy spreading signal generator despreading dummy original data by using the unused spreading code or codes available for employment, and generating dummy spreading signals;
- a superimposing unit superimposing the dummy spreading signals and received signals, and forming pseudo superimposed signals that correspond to the unused spreading codes available for employment;
- a despreading unit despreading the pseudo superimposed signals by using the unused spreading codes that are related to the corresponding pseudo superimposed signals, and the spreading codes that are already used for the communication channels that previously have been established; and
- a spreading code selector selecting an unused spreading code for allocation to a new communication channel, based on data for the communication channels reproduced for the pseudo superimposed signals and the reproduced dummy original data.

8. A code selection method according to claim 7, whereby the spreading code selector performs the code selection processing through the steps of:
- a decoder performing despreading for the received signal by using the spreading codes that are already employed for the communication channels that have been established, and decoding received data;
- a first differential unit obtaining, for each of the pseudo superimposing signals, a difference between data reproduced for the communication channels that have been established and corresponding data that have been received;
- a second differential unit obtaining a difference between dummy original data, which is decoded by the despreading unit for each of the pseudo superimposing signals, and the initial dummy original data, which have been employed for the spreading process; and
- a spreading code selector employing the output of the first differential unit and of the second differential unit to select an unused spreading code to be allocated to a new communication channel.

9. A code selection method according to claim 8, whereby, for a specific pseudo superimposing signal, the spreading code selector compares, with cross-correlation values for another identical pseudo superimposing signal, cross-correlation values between differential data output by the first differential unit and differential data output by the second differential unit, and selects an unused spreading code that has less affect on the communication channels that have been established.

10. A code selection method according to claim 9, whereby the spreading code selector obtains, as cross-correlation values, an even cross-correlation value and an odd cross-correlation value.

11. A code selection method according to claim 8, whereby the same differential configuration is applied, in a time-divided manner, for the first differential unit and the second differential unit.

12. A code selection method according to claim 7, whereby the despreading unit and the spreading code selector are provided for each communication channel; and whereby a spreading code is selected through parallel processing that uses a spreading code for each communication channel.

* * * * *